(12) United States Patent
Katayama et al.

(10) Patent No.: US 10,060,174 B2
(45) Date of Patent: Aug. 28, 2018

(54) SLIDING DOOR MODULE

(71) Applicants: AISIN SEIKI KABUSHIKI KAISHA, Kariya-shi (JP); HONDA MOTOR CO., LTD., Minato-ku (JP)

(72) Inventors: Hidefumi Katayama, Anjo (JP); Sadayuki Makino, Nagoya (JP); Satoshi Shibayama, Nagoya (JP); Tomohiro Negishi, Anjo (JP); Katsumi Chono, Hekinan (JP); Takahito Kobatake, Wako (JP); Masato Asakura, Wako (JP)

(73) Assignees: AISIN SEIKI KABUSHIKI KAISHA, Kariya-shi (JP); HONDA MOTOR CO., LTD., Minato-ku (JP)

( * ) Notice: Subject to any disclaimer, the term of this patent is extended or adjusted under 35 U.S.C. 154(b) by 0 days.

(21) Appl. No.: 15/528,891

(22) PCT Filed: Nov. 24, 2015

(86) PCT No.: PCT/JP2015/082946
§ 371 (c)(1),
(2) Date: May 23, 2017

(87) PCT Pub. No.: WO2016/084808
PCT Pub. Date: Jun. 2, 2016

(65) Prior Publication Data
US 2017/0342759 A1    Nov. 30, 2017

(30) Foreign Application Priority Data

Nov. 26, 2014  (JP) ................................. 2014-239253

(51) Int. Cl.
*E05F 11/48*    (2006.01)
*E05F 15/655*   (2015.01)
(Continued)

(52) U.S. Cl.
CPC ............... *E05F 15/655* (2015.01); *B60J 1/17* (2013.01); *B60J 5/06* (2013.01); *E05B 83/40* (2013.01);
(Continued)

(58) Field of Classification Search
CPC ..... E05F 15/655; E05F 15/643; E05F 15/689; B60J 1/17; E05Y 2900/531
(Continued)

(56) References Cited

U.S. PATENT DOCUMENTS 4,662,115 A * 5/1987 Ohya ..................... B60J 5/0413
                                                      49/502
4,945,682 A * 8/1990 Altman .................. B60J 5/0405
                                                      296/146.5
(Continued)

FOREIGN PATENT DOCUMENTS

JP    2003-97122 A     4/2003
JP    2009-531230 A    9/2009
(Continued)

OTHER PUBLICATIONS

Extended European Search Report dated Oct. 20, 2017 in Patent Application No. 15862511.1.
(Continued)

*Primary Examiner* — Jerry E Redman
(74) *Attorney, Agent, or Firm* — Oblon, McClelland, Maier & Neustadt, L.L.P.

(57) ABSTRACT

A sliding door module includes a resin base coupled to an inner panel of a sliding door, a window glass lifting and lowering device that lifts and lowers a window glass, and a door movement device that moves the sliding door. The window glass lifting and lowering device and the door movement device are coupled to the base.

8 Claims, 5 Drawing Sheets

(51) Int. Cl.
*E05F 15/689* (2015.01)
*E05F 15/643* (2015.01)
*E05B 83/40* (2014.01)
*B60J 5/06* (2006.01)
*B60J 1/17* (2006.01)

(52) U.S. Cl.
CPC .......... *E05F 15/643* (2015.01); *E05F 15/689* (2015.01); *E05Y 2900/531* (2013.01)

(58) Field of Classification Search
USPC .................................................. 49/352, 502
See application file for complete search history.

(56) References Cited

U.S. PATENT DOCUMENTS

| | | | | |
|---|---|---|---|---|
| 6,139,088 | A * | 10/2000 | Okamoto | B60J 5/0416 296/146.1 |
| 6,223,472 | B1 * | 5/2001 | Ishikawa | B60J 5/0416 296/146.6 |
| 6,857,688 | B2 * | 2/2005 | Morrison | B60J 5/0416 296/146.6 |
| 6,928,735 | B2 * | 8/2005 | Malik | B60J 5/0463 156/292 |
| 8,585,123 | B2 * | 11/2013 | Itou | B60N 2/4235 296/146.7 |
| 8,671,621 | B2 * | 3/2014 | Yoshida | E05F 11/486 49/352 |
| 9,255,432 | B2 * | 2/2016 | Imaoka | F16H 19/0618 |
| 2003/0009948 | A1 * | 1/2003 | Nishikawa | E05F 11/485 49/502 |
| 2005/0046230 | A1 | 3/2005 | Fukumoto et al. | |
| 2007/0296245 | A1 | 12/2007 | Kriese et al. | |
| 2008/0141592 | A1 * | 6/2008 | Nakajima | B60J 5/0416 49/502 |
| 2008/0229671 | A1 * | 9/2008 | Takeda | B60J 5/0416 49/502 |
| 2014/0117706 | A1 | 5/2014 | Fortin | |

FOREIGN PATENT DOCUMENTS

| | | |
|---|---|---|
| JP | 2011-174337 A | 9/2011 |
| JP | 2012-246618 A | 12/2012 |
| WO | WO 2007/111878 A2 | 10/2007 |

OTHER PUBLICATIONS

English translation of the International Preliminary Report on Patentability and Written Opinion dated May 30, 2017 in PCT/JP2015/082946.

International Search Report dated Feb. 23, 2016 in PCT/JP2015/082946 filed Nov. 24, 2015.

* cited by examiner

SLIDING DOOR MODULE

TECHNICAL FIELD

The present invention relates to a sliding door module that electrically moves a sliding door.

BACKGROUND ART

Patent document 1 describes a known example of a module incorporated in a swing door.

In the swing door module described in patent document 1, a window glass lifting/lowering device, a motor, a wire harness, and the like are coupled to a resin base. Such a module increases the efficiency for manufacturing swing doors.

PRIOR ART DOCUMENT

Patent Document

Patent Document 1: Japanese Laid-Open Patent Publication No. 2009-531230

SUMMARY OF THE INVENTION

Problems that are to be Solved by the Invention

However, the technique of patent document 1 cannot satisfy the demand for modularizing a sliding door that is electrically moved, and there is room for further improvement.

It is an object of the present invention to provide a sliding door module that increases the efficiency for manufacturing sliding doors.

Means for Solving the Problem

In one aspect, the present invention provides a sliding door module including a resin base coupled to an inner panel of a sliding door, a window glass lifting/lowering device configured to lift and lower a window glass, and a door movement device configured to move the sliding door. The window glass lifting/lowering device and the door movement device are coupled to the base.

EMBODIMENTS OF THE INVENTION

A sliding door module 30 will now be described with reference to FIGS. 1 to 7.

Figure 1:
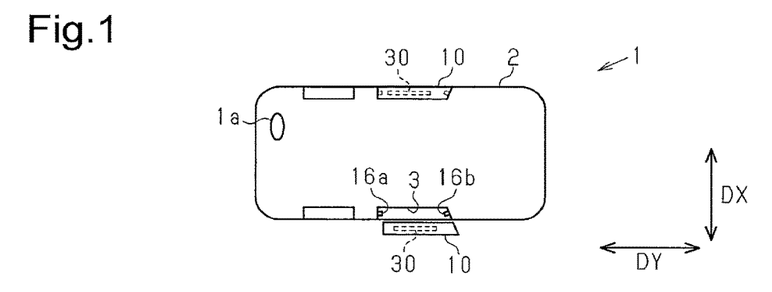
FIG. 1 is a schematic diagram showing a vehicle including one embodiment of a sliding door module.

FIG. 1 is a plan view that is a bird's eye view of a vehicle 1. In FIG. 1, a steering wheel 1a is arranged at the front side of the vehicle 1. When a sliding door 10 is coupled to a vehicle body 2, a direction corresponding to the vertical direction of the vehicle 1 is referred to as the "vertical direction DZ" of the sliding door module 30, a direction corresponding to the front-to-rear direction of the vehicle 1 is referred to as the "front-to-rear direction DY" of the sliding door module 30, and a direction corresponding to the widthwise direction of the vehicle 1 is referred to as the "widthwise direction DX" of the sliding door module 30.

The sliding door 10 is coupled to an entrance 3 of the vehicle body 2.

The sliding door 10 is moved along a door rail on the vehicle body 2 from a fully-closed position where the sliding door 10 closes the entrance 3 to a fully-open position where the sliding door 10 fully opens the entrance 3. The sliding door 10 is coupled to the vehicle body 2 to be movable outward in the widthwise direction DX from the fully-closed position and movable in the front-to-rear direction DY in a state moved outward from the fully-closed position.

Figure 2:
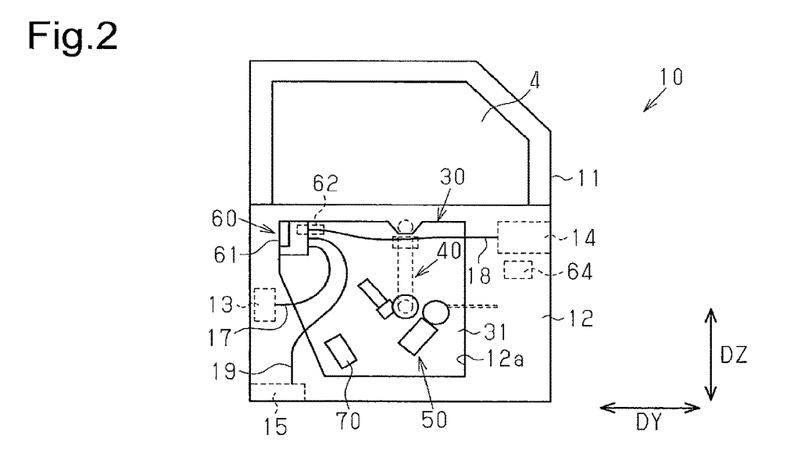
FIG. 2 is a schematic diagram of the sliding door shown in FIG. 1.

FIG. 2 is a schematic view showing the internal structure of the sliding door 10.

The sliding door 10 includes an outer panel 11, an inner panel 12, the sliding door module 30 coupled to the inner panel 12, and a window glass 4. An interior panel is coupled to the inner side (vehicle inner side) of the inner panel 12.

The inner panel 12 is coupled to the inner side of the outer panel 11. The inner panel 12 includes an opening 12a in which the sliding door module 30 is arranged. The window glass 4 may be accommodated in a space between an inner member, which includes the inner panel 12 and the sliding door module 30, and the outer panel 11.

The sliding door 10 includes a first lock device 13 located at the front side of the sliding door 10, a second lock device 14 located at the rear side of the sliding door 10, and a third lock device 15 located at the lower side of the sliding door 10. The first to third lock devices 13 to 15 are located between the outer panel 11 and the inner panel 12.

The first lock device 13 is configured to engage a striker 16a (refer to FIG. 1) arranged at the front edge of the entrance 3 of the vehicle body 2.

The second lock device 14 is configured to engage a striker 16b (refer to FIG. 1) arranged at the rear edge of the entrance 3 of the vehicle body 2.

The third lock device 15 is configured to engage a striker (not shown) arranged at the lower edge of the entrance 3 of the vehicle body 2.

When the sliding door 10 is located at the fully-closed position, the first and second lock devices 13 and 14 constrain the sliding door 10. When the sliding door 10 is located at the fully-open position, the third lock device 15 constrains the sliding door 10. The first and second lock devices 13 and 14 or the third lock device 15 restricts movement of the sliding door 10 by constraining the sliding door 10.

One example of the first lock device 13 will now be described with reference to FIGS. 3A and 3B. The second lock device 14 and the third lock device 15 each have a structure similar to the first lock device 13. The first lock device 13 is operated by a cable 17, the second lock device 14 is operated by a cable 18, and the third lock device 15 is operated by a cable 19.

The first lock device 13 includes a base plate 20, a latch 21, and a pawl 23 configured to engage the latch 21.

The base plate 20 includes an insertion portion (hereinafter referred to as the "base insertion portion 20a") into which the striker 16a is inserted.

The latch 21 includes an insertion portion (hereinafter referred to as the "latch insertion portion 21a") into which the striker 16a is inserted. The latch 21 is rotationally coupled to the base plate 20 by a latch pivot shaft 22.

The pawl 23 is rotationally coupled to the base plate 20 by a pawl pivot shaft 24 located at a position separated from the latch pivot shaft 22. A projection 25 extends from the rotation center of the pawl 23. The cable 17 that rotates the pawl 23 is connected to the projection 25. That is, the pawl 23 is rotated when the cable 17 is operated.

Figure 3A:
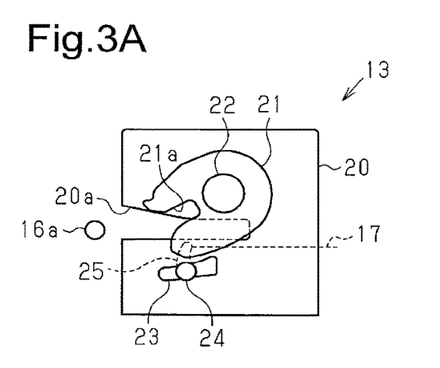
FIGS. 3A and 3B are schematic diagrams of the first lock device shown in FIG. 3.
Figure 3B:
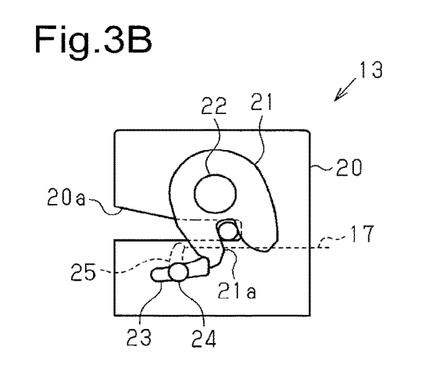

The first lock device 13 can shift to a state in which the striker 16a is insertable into and removable from the first lock device 13 (hereinafter referred to as the "released state") as shown in FIG. 3A and a state in which the striker 16a is constrained in the base insertion portion 20a and the latch insertion portion 21a (hereinafter referred to as the "constrained state") as shown in FIG. 3B.

In the released state of the first lock device 13, the latch 21 is arranged so that an inlet of the latch insertion portion 21a overlaps an inlet of the base insertion portion 20a. When the first lock device 13 is in the released state, the pawl 23 does not engage the latch 21. This allows for rotation of the latch 21.

In the constrained state of the first lock device 13, the latch 21 is arranged so that the inlet of the latch insertion portion 21a does not overlap the inlet of the base insertion portion 20a. When the first lock device 13 is in the constrained state, the pawl 23 engages the latch 21 to restrict rotation of the latch 21. Thus, even when movement of the sliding door 10 produces a force that acts on the striker 16a and the latch 21 to separate the striker 16a and the latch 21 from each other, rotation of the latch 21 is restricted. This maintains the striker 16a in the constrained state. Rotation of the pawl 23 disengages the latch 21 from the pawl 23. The pawl 23 is rotated when a door opening/closing device 60 connected to the pawl 23 by the cable 17 is operated.

Figure 4:
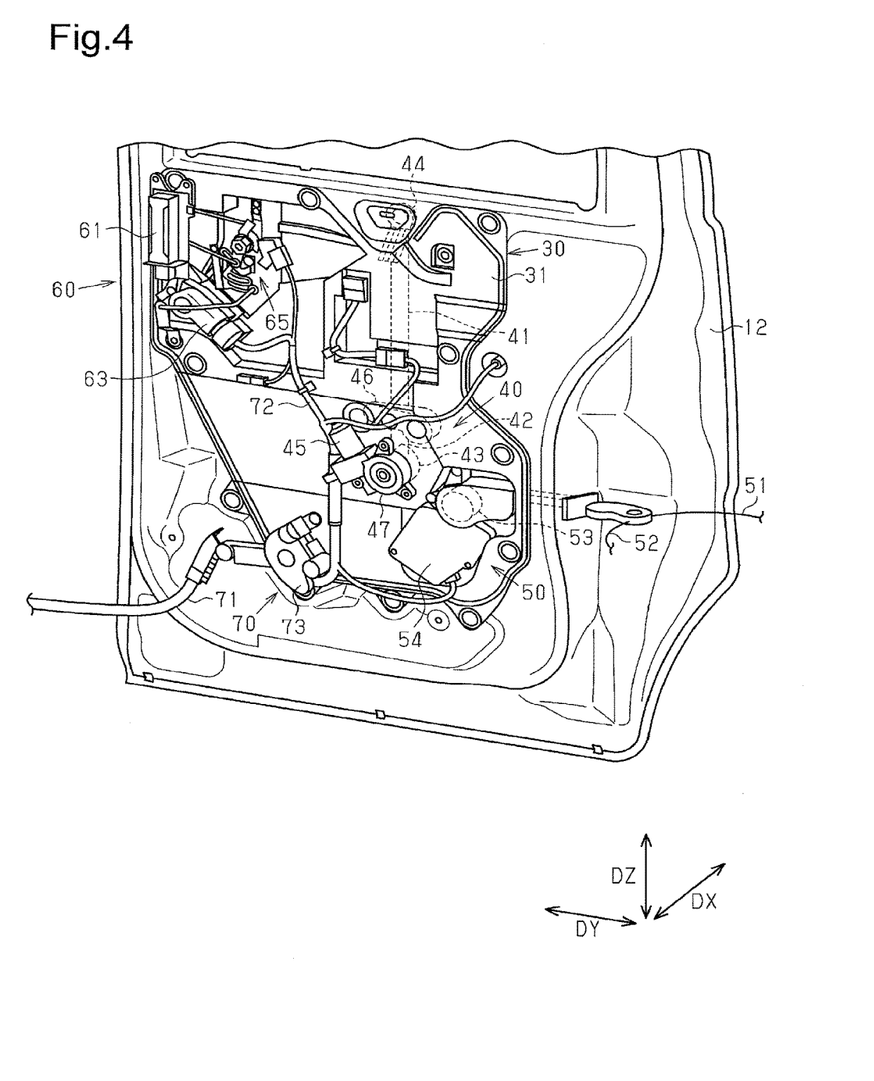
FIG. 4 is a perspective view of the sliding door shown in FIG. 2.

The sliding door module 30 will now be described with reference to FIG. 4.

The sliding door module 30 includes a resin base 31, a window glass lifting/lowering device 40 configured to lift and lower the window glass 4, a door movement device 50 configured to move the sliding door 10, the door opening/closing device 60 configured to operate the first to third lock devices 13 to 15, and a power supplying device 70 that supplies power to these devices. The window glass lifting/lowering device 40, the door movement device 50, the door opening/closing device 60, and the power supplying device 70 are coupled to the base 31.

The window glass lifting/lowering device 40 includes first and second cables 41 and 42 that pull the window glass 4, a drum 43 (first drum) that winds the first and second cables 41 and 42, a pulley 44 that tensions the first and second cables 41 and 42 in cooperation with the drum 43, a motor 45 (first motor) that rotates the drum 43, and a carrier 46 coupled to the lower end of the window glass 4.

The drum 43 and the pulley 44 are located on the outer surface of the base 31. The motor 45 is located on the inner surface of the base 31 (vehicle inner side surface in widthwise direction DX; hereinafter the same). The motor 45 and the drum 43 are connected by a reduction drive 47. The reduction drive 47 includes a output shaft that is inserted through a through hole in the base 31 and connected to the drum 43.

The first cable 41 is tensioned extending to the pulley 44 and back from the pulley 44. One end of the first cable 41 is connected to the drum 43, and the other end of the first cable 41 is connected to the carrier 46.

The second cable 42 extends in the direction opposite to the first cable 41 with respect to the carrier 46. One end of the second cable 42 is connected to the carrier 46, and the other end of the second cable 42 is connected to the drum 43.

When rotation of the drum 43 winds the first cable 41 or the second cable 42 around the drum 43, the carrier 46 moves as the first cable 41 and the second cable 42 move. This lifts and lowers the window glass 4 within a predetermined movement range.

The door movement device 50 includes third and fourth cables 51 and 52 that pull the sliding door 10, a drum 53 (second drum) that winds the third and fourth cables 51 and 52, and a motor 54 (second motor) that rotates the drum 53. The drum 53 is connected to the motor 54 by a reduction drive.

One end of the third cable 51 is connected to the vehicle body 2, and the other end of the third cable 51 is connected to the drum 53. In the same manner, one end of the fourth cable 52 is connected to the vehicle body 2, and the other end of the fourth cable 52 is connected to the drum 53. The third cable 51 and the fourth cable 52 are wound around the drum 53 in opposite directions. When rotation of the drum 53 winds the third cable 51 or the fourth cable 52 around the drum 53, the sliding door 10 moves.

The door opening/closing device 60 (refer to FIG. 5) includes an inner handle 61, a locking actuator 63, and a transmission mechanism 65 that activates the first to third lock devices 13 to 15 based on various operations. An outer handle 62 coupled to the outer side of the sliding door 10 is connected to the door opening/closing device 60 by a lever and a pawl. A release actuator 64 (refer to FIG. 2), which will be described later, coupled to the inner panel 12 is connected to the transmission mechanism 65 by a cable.

Figure 5:
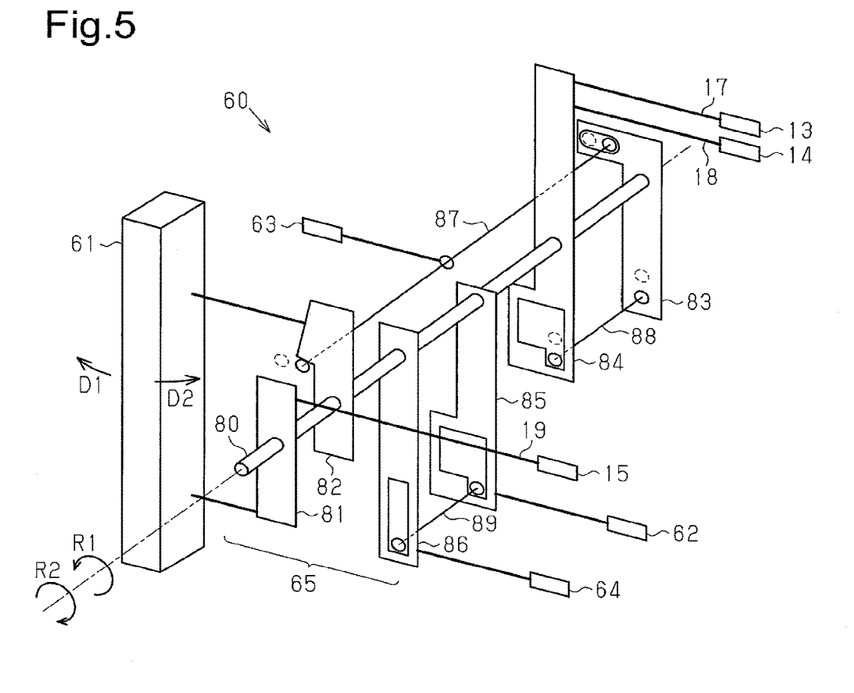
FIG. 5 is a schematic diagram of a door opening/closing device shown in FIG. 2.

The inner handle 61 is rotationally coupled to the base 31 of the sliding door module 30. The inner handle 61 projects from the interior panel toward the inner side (seat side) in the widthwise direction DX.

When the inner handle 61 is rotated in a first direction D1 by a first predetermined operation (hereinafter referred to as the "closing operation"), the rotation is transmitted to the third lock device 15 through the transmission mechanism 65. The transmitted power rotates the pawl of the third lock device 15 and shifts the third lock device 15 to the released state. For example, when the sliding door 10 is constrained by the third lock device 15 at the fully-open position, the sliding door 10 becomes movable by the closing operation being performed on the inner handle 61.

When the inner handle 61 is rotated in a second direction D2 by a second predetermined operation (hereinafter referred to as the "opening operation"), the rotation is transmitted to the first and second lock devices 13 and 14 through the transmission mechanism 65. The transmitted power rotates the pawls of the first and second lock devices 13 and 14 and shifts the first and second lock devices 13 and 14 to the released states. For example, when the sliding door 10 is constrained by the first and second lock devices 13 and 14 at the fully-closed position, the sliding door 10 becomes movable by the opening operation being performed on the inner handle 61.

The outer handle 62 (refer to FIG. 2) is rotationally coupled to the outer surface of the outer panel 11.

Rotation of the outer handle 62 is transmitted to the transmission mechanism 65.

When the outer handle 62 is pulled to rotate in a predetermined direction, the rotation power is transmitted to the first to third lock devices 13 to 15. The transmitted power rotates the pawls of the first to third lock devices 13 to 15 and shifts the first to third lock devices 13 to 15 to the released states. For example, when the sliding door 10 is constrained at the fully-closed position or at the fully-open position, the sliding door 10 becomes movable by performing a pulling operation on the outer handle 62.

The locking actuator 63 shifts the sliding door 10 to a door-locked state. The door-locked state is a state in which the sliding door 10 cannot be moved from the fully-closed position by performing the opening or closing operation on the inner handle 61 or by performing the pulling operation on the outer handle 62.

The locking actuator 63, which is operated by a lock-on operation of a locking switch, moves a second engagement pin 88 (described later) to a position where rotation of the inner handle 61 and the outer handle 62 is not transmitted to the first to third lock devices 13 to 15.

The release actuator 64 maintains the first to third lock devices 13 to 15 in the released states for a predetermined time. More specifically, the release actuator 64 functions when a predetermined condition is satisfied to rotate a sixth lever 86 (described later) with a cable and rotate first, third, and fourth levers 81, 83, and 84 with a fifth lever 85 to maintain the first to third lock devices 13 to 15 in the released states. The predetermined condition is, for example, the opening operation or closing operation being performed on the inner handle 61 or the pulling operation being performed on the outer handle 62.

Referring back to FIG. 4, the power supplying device 70 includes a first wire 71 connected to a battery in the vehicle body 2, a plurality of second wires 72 connected to each device, and an accommodation portion 73 that accommodates the first wire 71 in the sliding door 10 in accordance with the movement distance (movement distance using fully-closed position as reference position). That is, the power supplying device 70 eliminates slack in the first wire 71 when the sliding door 10 moves.

The transmission mechanism 65 of the door opening/closing device 60 will now be described with reference to FIG. 5.

The transmission mechanism 65 includes the first lever 81, a second lever 82, and the third to sixth levers 83 to 86. The transmission mechanism 65 further includes a first engagement pin 87, the second engagement pin 88, and a third engagement pin 89 that function to engage predetermined levers with each other and disengage the levers from each other. The first to sixth levers 81 to 86 are rotationally coupled to a pivot shaft 80 fixed to the base 31 of the sliding door module 30. The first to sixth levers 81 to 86 are biased by, for example, a spring in a second rotation direction R2 (rotation direction opposite to first rotation direction R1, which will be described later).

The first lever 81 is connected to the inner handle 61 so as to move in cooperation with rotation of the inner handle 61 in the first direction D1 and connected to the pawl of the third lock device 15 by the cable 19. That is, the first lever 81 is rotated in the first rotation direction D1 in correspondence with rotation of the inner handle 61 in the first direction D1 to shift the third lock device 15 to the disengaged state.

The second lever 82 is connected to the inner handle 61 so as to move in cooperation with rotation of the inner handle 61 in the first and second directions D1 and D2 and coupled to the third lever 83 by the first engagement pin 87.

The third lever 83 is coupled to the second lever 82 by the first engagement pin 87 and coupled to the fourth lever 84 by the second engagement pin 88.

The fourth lever 84 is coupled to the third lever 83 by the second engagement pin 88, connected to the pawl of the first lock device 13 by the cable 17, and connected to the pawl of the second lock device 14 by the cable 18.

The fifth lever 85 is connected to the outer handle 62 so as to move in cooperation with rotation of the outer handle 62 and coupled to the sixth lever 86 by the third engagement pin 89. Further, the fifth lever 85 is configured to engage the first lever 81 and the third lever 83 when the fifth lever 85 is rotated in the first rotation direction R1. That is, rotation of the outer handle 62 rotates the fifth lever 85 in the first rotation direction R1. This, in turn, rotates the first lever 81 and the third lever 83 in the first rotation direction R1.

The sixth lever 86 is connected to the release actuator 64 by a cable and coupled to the fifth lever 85 by the third engagement pin 89.

That is, the release actuator 64 rotates the sixth lever 86. This, in turn, rotates the fifth lever 85.

The first engagement pin 87 is moved based on a predetermined operation of a child-lock switch (child-lock operation) so that the second lever 82 and the third lever 83 are shifted to a coupled state or a non-coupled state. The coupled state refers to a state in which the second lever 82 and the third lever 83 move in cooperation with each other, and the non-coupled state refers to a state in which the second lever 82 and the third lever 83 are rotated independently from each other. The same applies to the following description.

The second engagement pin 88 is moved by operating the locking actuator 63 based on the lock-on operation or a lock-off operation of the locking switch so that the third lever 83 and the fourth lever 84 are shifted to the coupled states or the non-coupled states.

The third engagement pin 89 is located at a position where the fifth lever 85 and the sixth lever 86 are coupled to each other. Based on a predetermined operation, the third engagement pin 89 is moved to a position where the fifth lever 85 and the sixth lever 86 are not coupled to each other (hereinafter referred to as the "non-engaged position"). The predetermined operation is performed to move the third engagement pin 89 to the non-engaged position when, for example, the fifth lever 85 and the sixth lever 86 need to be rotated independently from each other such as when the release actuator 64 stops functioning.

The transmission mechanism 65 operates as follows.

When the inner handle 61 is rotated in the first direction D1, the first lever 81 is rotated in the first rotation direction R1. The rotation of the first lever 81 rotates the pawl of the third lock device 15 to shift the third lock device 15 to the disengaged state. That is, when the sliding door 10 is constrained by the third lock device 15 at the fully-open position, the sliding door 10 becomes movable by rotating the inner handle 61 in the first direction D1.

When the inner handle 61 is rotated in the second direction D2, the second lever 82 is rotated in the first rotation direction R1. When the first engagement pin 87 and the second engagement pin 88 couple the second lever 82, the third lever 83, and the fourth lever 84, the fourth lever 84 is rotated in cooperation with the rotation of the second lever 82 to shift the first and second lock devices 13 and 14 to the disengaged states. That is, when the sliding door 10 is constrained by the first and second lock devices 13 and 14 at the fully-closed position, the sliding door 10 becomes movable by rotating the inner handle 61 in the second direction D2.

When at least one of the condition in which the second lever 82 and the third lever 83 are not coupled and the condition in which the third lever 83 and the fourth lever 84 are not coupled is satisfied, rotation of the second lever 82 is not transmitted to the fourth lever 84. Thus, even when the inner handle 61 is rotated in the second direction D2, the first and second lock devices 13 and 14 stop functioning. Thus, in this case, even if the inner handle 61 is rotated in the second direction D2 when the sliding door 10 is located at the fully-closed position, the state of the sliding door 10 constrained by the first and second lock devices 13 and 14 is maintained.

When the outer handle 62 is rotated, the fifth lever 85 is rotated in the first rotation direction R1. The rotation of the fifth lever 85 in the first rotation direction R1 engages the fifth lever 85 with the first lever 81 and the third lever 83. This rotates the first lever 81 and the third lever 83 in cooperation with the fifth lever 85. When the third lever 83 and the fourth lever 84 are coupled and the sliding door 10 is constrained at the fully-closed position or at the fully-open position, the first to third lock devices 13 to 15 each accordingly shift to the released state and the sliding door 10 becomes movable. When the third lever 83 and the fourth lever 84 are not coupled, the fourth lever 84 does not rotate. Thus, even if the outer handle 62 is rotated when the sliding door 10 is located at the fully-closed position, the first and second lock devices 13 and 14 maintain the sliding door 10 in the constrained state.

Further, rotation of the inner handle 61 or the outer handle 62 operates the release actuator 64 and thereby rotates the sixth lever 86. Rotation of the sixth lever 86 rotates the fifth lever 85 in the first rotation direction R1. This maintains the first to third lock devices 13 to 15 in the disengaged states for a predetermined time and maintains the first to third lock devices 13 to 15 in the released states for the predetermined time. Accordingly, the sliding door 10 smoothly moves from a state constrained at the fully-closed position or the fully-open position.

The arrangement of each device on the base 31 will now be described with reference to FIG. 6.

The base 31 is molded from a resin. For example, the base 31 is formed from a foamed resin. The use of a foamed resin increases the thickness of the base 31 as compared to a non-foamed resin and thus increases the strength and rigidity of the base 31.

The upper edge of the base 31 includes a cutout 32. A support 33 that supports the pulley 44 of the window glass lifting/lowering device 40 projects from an edge of the cutout 32.

The base 31 includes a middle portion 31x, an upper front portion 31a located in front of the middle portion 31x in the front-to-rear direction DY, and an upper rear portion 31b located at the rear of the middle portion 31x. Further, the base 31 includes a lower front portion 31c located below the upper front portion 31a in the vertical direction DZ and a lower rear portion 31d located below the upper rear portion 31b and at the rear of the lower front portion 31c. The middle portion 31x extends in the vertical direction DZ.

Figure 6:
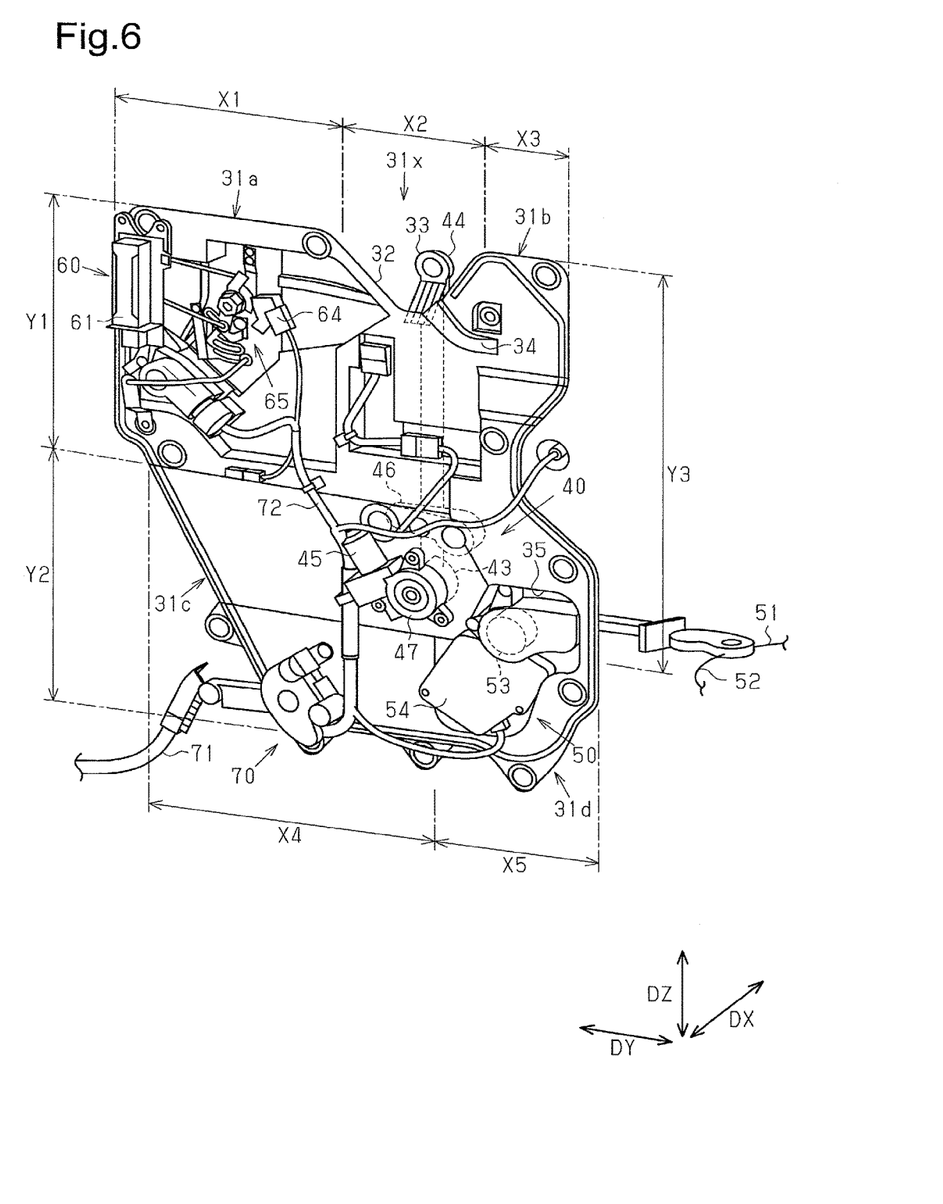
FIG. 6 is a perspective view of the sliding door module shown in FIG. 4.

The middle portion 31x is a portion defined by range X2 and range Y3 in FIG. 6. The upper front portion 31a is a portion defined by range X1 and range Y1 in FIG. 6. The upper rear portion 31b is a portion defined by range X3 and range Y1 in FIG. 6. The lower front portion 31c is a portion defined by range X4 and range Y2 in FIG. 6 (excluding middle portion 31x). The lower rear portion 31d is a portion defined by range X5 and range Y2 in FIG. 6 (excluding middle portion 31x). In the base 31, range X1 is located in front of range X2, and range X3 is located at the rear of range X2. Ranges X1, X2, and X3 are arranged next to one another in the front-to-rear direction DY without overlapping one another. In the base 31, range Y1 is located above range Y2. Ranges Y1 and Y2 are arranged next to each other in the vertical direction DZ without overlapping each other.

The motor 45 and the reduction drive 47 of the window glass lifting/lowering device 40 are arranged on the inner surface at the lower part of the middle portion 31x of the base 31.

The drum 43 of the window glass lifting/lowering device 40 is arranged on the outer surface at the lower part of the middle portion 31x of the base 31.

The door opening/closing device 60 is located on the inner surface of the upper front portion 31a of the base 31. The window glass lifting/lowering device 40 is located in the front-to-rear direction between the door opening/closing device 60 and the door movement device 50.

The inner surface of the upper rear portion 31b of the base 31 includes a guidance groove 34 that guides each of the cables 17 to 19 extending from the corresponding device. The guidance groove 34 is configured to be recessed inward in the widthwise direction DX from the outer surface of the base 31.

The power supplying device 70 is located on the inner surface of the lower front portion 31c of the base 31. The power supplying device 70 is located downward from the lower extremity of the movement range of the window glass 4. The lower extremity of the movement range refers to the position of the lower edge of the window glass 4 when the window glass 4 is located at the bottom dead center.

The inner surface of the lower rear portion 31d of the base 31 includes a recess 35 that accommodates the drum 53 and the motor 54 of the door movement device 50. The recess 35 is configured to be recessed outward in the widthwise direction DX from the inner surface of the base 31 (surface on which reduction drive 47 is located). The recess 35 is located downward from the lower extremity of the movement range of the window glass 4. That is, the drum 53 and the motor 54 are located downward from the lower extremity of the movement range of the window glass 4.

Figure 7:
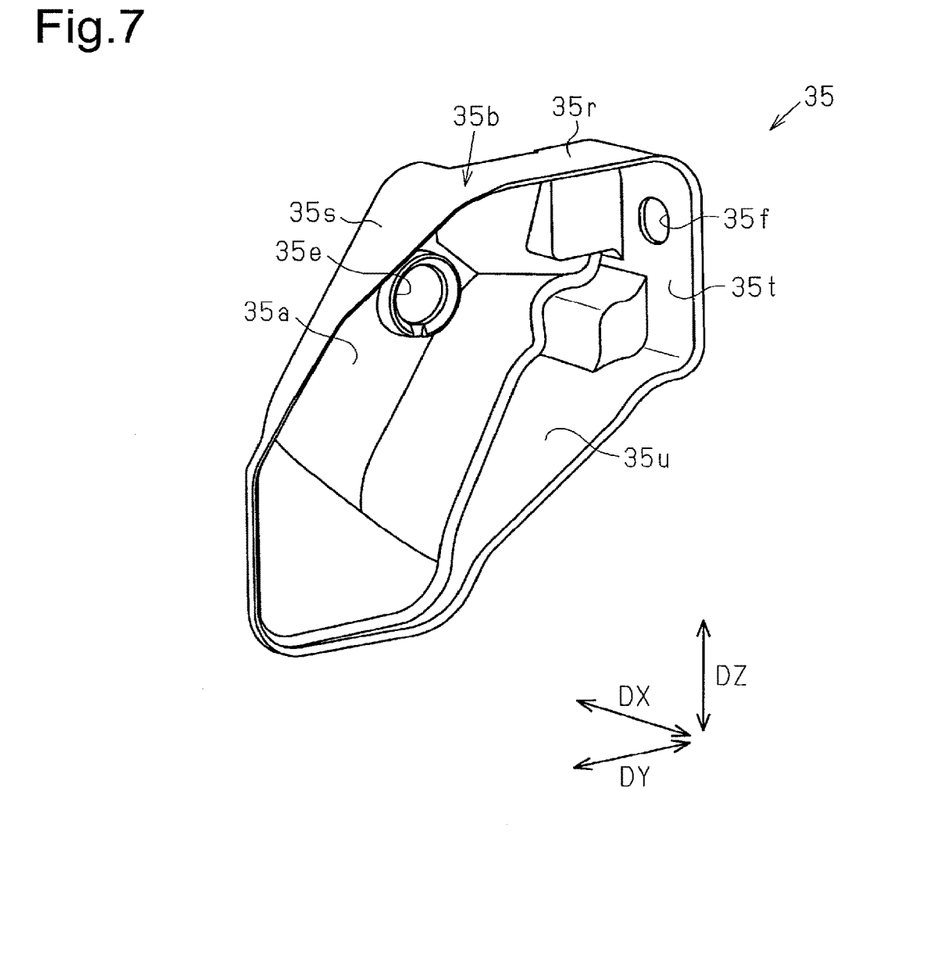
FIG. 7 is a perspective view of a recess shown in FIG. 6.

One example of the recess 35 will now be described with reference to FIG. 7.

The recess 35 includes, for example, a bottom wall 35a and a peripheral wall 35b that serve as side walls. The peripheral wall 35b surrounds the bottom wall 35a. The bottom wall 35a is inclined so that the recess 35 shallows toward the lower side. The peripheral wall 35b includes at least an upper wall 35r, a front wall 35s, a rear wall 35t, and a lower wall 35u. The upper wall 35r, the front wall 35s, the rear wall 35t, and the lower wall 35u extend at an angle close to perpendicular (angle that allows base 31 to be removed from molding die and is close to perpendicular) to the inner surface of the base 31 (surface of portion where reduction drive 47 is located), and the upper wall 35r and the rear wall 35t are arranged at an angle of 90° or an angle close to 90° (for example, 80° to 110°). The front wall 35s is located near the drum 43 of the window glass lifting/lowering device 40 but without overlapping the drum 43. That is, the drum 43 and the recess 35 are arranged next to each other as viewed from above.

The bottom wall 35a includes a positioning recess 35e that positions an output shaft of the motor 54.

Further, the rear wall 35t includes a through hole 35f through which the third and fourth cables 51 and 52 of the door movement device 50 are inserted. The drum 53 of the door movement device 50 is located at the inner side (vehicle inner side) of the motor 54 in the widthwise direction DX.

The advantages of the sliding door module 30 of the present embodiment will now be described.

(1) In the sliding door module 30, the window glass lifting/lowering device 40 and the door movement device 50 are coupled to the base 31.

In this structure, various devices are coupled to the base 31. Thus, the various devices can be coupled to the sliding door 10 by coupling the sliding door module 30 to the inner panel 12 of the sliding door 10. This increases the manufacturing efficiency of the sliding door 10 as compared to when various devices are separately coupled to the inner panel 12.

(2) The window glass lifting/lowering device 40 includes the drum 43 and the pulley 44 that are located at different heights in the vertical direction DZ. The first and second cables 41 and 42 extend linearly. The pulley 44 is located above the drum 43. The motor 45 is located at substantially the same height as the drum 43 or downward from the drum 43.

Conventionally, the motor 45 is located above the drum 43 to shorten the length of a window glass lifting/lowering device in the vertical direction. Thus, space is used more efficiently during transportation. In this regard, in the above structure, the window glass lifting/lowering device 40 that is coupled to the base 31 allows for freedom of the layout of each component as long as the component does not project out of the base 31. This allows the motor 45 to be located at substantially the same height as the drum 43 or downward from the drum 43 taking into account the center of gravity of the sliding door module 30.

For example, a conventional sliding door module (module that does not include door movement device 50) includes an upper pulley, a lower pulley, and a drum, with the drum and the motor located above the lower pulley. In this regard, in the above structure, the window glass lifting/lowering device 40 includes the drum 43 and the pulley 44 that are located at different heights in the vertical direction DZ, and the motor 45 is located at substantially the same height as the drum 43, which is located at a lower position than the pulley 44, or downward from the drum 43. This lowers the center of gravity of the sliding door module 30. Thus, the center of gravity of the vehicle 1, to which the sliding door module 30 of the above structure is coupled, is lower than the conventional sliding door module.

(3) The motor 54 is located downward from the lower extremity of the movement range of the window glass 4. This structure also lowers the center of gravity of the vehicle 1, to which the sliding door module 30 is coupled.

(4) The sliding door module 30 further includes the door opening/closing device 60. The window glass lifting/lowering device 40 is located between the door movement device 50 and the door opening/closing device 60 in the front-to-rear direction DY.

In this structure, the weight of the sliding door module 30 is not biased at the front side or the rear side of the window glass lifting/lowering device 40 in the vehicle, to which the sliding door module 30 is coupled. Thus, the center of gravity of the sliding door 10 is well-balanced. That is, the sliding door module 30 improves the balance of the center of gravity of the sliding door 10.

(5) The sliding door module 30 includes the window glass lifting/lowering device 40, the door movement device 50, the door opening/closing device 60, and the power supplying device 70. The power supplying device 70 is located downward from the lower extremity of the movement range of the window glass 4.

In this structure, the power supplying device 70 is coupled to the base 31. Thus, when the inner panel 12 of the sliding door 10 is coupled to the sliding door module 30, the power supplying device 70 is coupled to the sliding door 10 together with the devices 40, 50, and 60. This increases the manufacturing efficiency of the sliding door 10 as compared to when the inner panel 12 is coupled to the power supplying device 70 separately from the sliding door module 30. Since the power supplying device 70 is located downward from the lower extremity of the movement range of the window glass 4, the power supplying device 70 moves the center of gravity of the vehicle 1 for the same reason as above.

(6) The pulley 44 of the window glass lifting/lowering device 40 is coupled to the inner panel 12.

At the point of time the window glass 4 stops at the upper dead center or the lower dead center, the motor 45 continues to rotate the drum 43. Thus, when the window glass 4 stops at the upper dead center or the lower dead center, the tension acting on the first cable 41 increases and a large force (hereinafter referred to as the "impact force") is applied to the pivot shaft of the pulley 44.

As a result, when the pulley 44 of the window glass lifting/lowering device 40 is coupled to the base 31, the impact force produced when the window glass 4 is stopped at the upper dead center or the lower dead center is applied to the base 31 through the pulley 44. Thus, the base 31 may deteriorate when the total number of times the window glass 4 is closed and opened exceeds the tolerable number of times the window glass 4 can be opened and closed. In this regard, in the above structure, the pulley 44 is coupled to the inner panel 12. Thus, the impact force produced when the window glass 4 is stopped at the upper dead center or the lower dead center is partially applied to the inner panel 12. This distributes the impact force and thus reduces deterioration of the base 31.

(7) The drum 53 and the motor 54 of the door movement device 50 are accommodated in the recess 35 of the base 31. The recess 35 is configured to be recessed outward in the widthwise direction DX and is located next to the drum 43 (first drum).

In this structure, the recess 35 not only accommodates the drum 43 and the motor 54 but also functions as a reinforcement that reinforces the base 31. When the recess 35 is located next to the drum 43 of the window glass lifting/lowering device 40, the motor 45 and the motor 54 are located at relatively close positions. Thus, among the components coupled to the base 31, the relatively heavy components are arranged within a narrow range. This decreases twisting moment or bending moment applied to the base 31 as compared to when the heavy components are located at separated positions. Thus, the twisting stress or bending stress applied to the base 31 is reduced. This reduces the deterioration of the base 31.

(8) The peripheral wall 35*b* of the recess 35 includes the through hole 35*f* through which the third and fourth cables 51 and 52 are inserted.

This structure allows the third and fourth cables 51 and 52 to extend linearly toward the vehicle body 2. Thus, there is no need to lay out the third and fourth cables 51 and 52 to extend over the peripheral wall 35*b* of the recess 35. This simplifies the structure for guiding the third and fourth cables 51 and 52.

Other embodiments will now be described.

In the above embodiment, a device that differs from the above devices may be coupled to the base 31 of the sliding door module 30. For example, an acoustic speaker unit may be coupled to the base 31 of the sliding door module 30.

In the above embodiment, the drum 43 and the recess 35 of the window glass lifting/lowering device 40 are located next to each other as viewed from above. However, there is no limit to the direction in which the drum 43 and the recess 35 are arranged next to each other. In the sliding door module 30 shown in FIG. 5, the drum 43 and the recess 35 are located next to each other in a diagonal direction. Instead, the drum 43 and the recess 35 may be located next to each other in the vertical direction DZ or in the front-to-rear direction DY.

In the above embodiment, in the window glass lifting/lowering device 40, a single pulley 44 and a single drum 43 tension the cables 41 and 42. Instead, for example, in the window glass lifting/lowering device 40, the cables may be tensioned by two pulleys and a drum. Alternatively, the cables may be tensioned by four pulleys and the drum 43.

In the above embodiment, the door opening/closing device 60 includes a plurality of the levers 81 to 86. However, the door opening/closing device 60 does not have to be structured in this manner. In addition, the structure of the inner handle 61 is not limited to that of the embodiment.

The invention claimed is:

1. A sliding door module comprising:
a resin base coupled to an inner panel of a sliding door;
a window glass lifting and lowering device configured to lift and lower a window glass; and
a door movement device configured to move the sliding door,
wherein the window glass lifting and lowering device and the door movement device are coupled to the base,
the window glass lifting and lowering device includes first and second cables that pull the window glass, a first drum that winds the first and second cables, a pulley that is located above the first drum and tensions the first and second cables in cooperation with the first drum, and a first motor that rotates the first drum,
the door movement device includes third and fourth cables that pull the sliding door, a second drum that winds the third and fourth cables, and a second motor that rotates the second drum, and
the first motor is located at substantially the same height as the first drum or downward from the first drum.

2. The sliding door module according to claim 1, wherein the second motor is located downward from a lower extremity of a movement range of the window glass.

3. The sliding door module according to claim 1, further comprising a door opening/closing device configured to operate a lock device of the sliding door,
wherein the window glass lifting and lowering device is located between the door movement device and the door opening/closing device in a front-to-rear direction.

4. The sliding door module according to claim 1, further comprising a power supplying device that supplies power to at least the first motor and the second motor, wherein
the power supplying device is located downward from a lower extremity of a movement range of the window glass.

5. The sliding door module according to claim 1, wherein the pulley of the window glass lifting and lowering device is coupled to the inner panel.

6. The sliding door module according to claim 1, wherein the second drum and the second motor are accommodated in a recess of the base, and
the recess is configured to be recessed outward in a vehicle widthwise direction and is located next to the first drum.

7. The sliding door module according to claim 6, wherein a side wall of the recess includes a through hole through which the third and fourth cables are inserted.

8. The sliding door module according to claim 6, wherein a bottom of the recess includes a positioning recess that positions an output shaft of the second motor.

* * * * *